(12) United States Patent  
Tourigny

(10) Patent No.: US 7,617,953 B2
(45) Date of Patent: Nov. 17, 2009

(54) PNEUMATIC DISPENSING SYSTEM WITH LINEAR ACTUATION AND METHOD

(75) Inventor: Robert P. Tourigny, Smithfield, RI (US)

(73) Assignee: Nordson Corporation, Westlake, OH (US)

( * ) Notice: Subject to any disclaimer, the term of this patent is extended or adjusted under 35 U.S.C. 154(b) by 779 days.

(21) Appl. No.: 11/238,267

(22) Filed: Sep. 29, 2005

(65) Prior Publication Data

US 2007/0068974 A1    Mar. 29, 2007

(51) Int. Cl.
 *B67D 5/40* (2006.01)
(52) U.S. Cl. ..................... 222/389; 222/309
(58) Field of Classification Search ............... 222/389, 222/309, 373, 267, 282–300, 308, 335, 402
See application file for complete search history.

(56) References Cited

U.S. PATENT DOCUMENTS

| | | | |
|---|---|---|---|
| 5,022,556 A * | 6/1991 | Dency et al. ............... | 222/1 |
| 5,467,899 A * | 11/1995 | Miller ...................... | 222/309 |
| 5,630,527 A | 5/1997 | Beebe et al. | |
| 5,765,722 A | 6/1998 | Beebe et al. | |
| 5,964,381 A | 10/1999 | El-Hage et al. | |
| 6,575,331 B1 | 6/2003 | Peeler et al. | |
| 6,682,601 B1 | 1/2004 | Beebe | |
| 6,923,938 B2 * | 8/2005 | Cote et al. ................. | 422/100 |
| 7,090,190 B2 * | 8/2006 | Yasue et al. ............... | 251/63.5 |

FOREIGN PATENT DOCUMENTS

| | | |
|---|---|---|
| DE | 1498473 B1 | 9/1970 |
| DE | 2611493 A1 | 9/1977 |
| EP | 0911615 A1 | 4/1999 |
| EP | 1087842 B1 | 4/2001 |
| EP | 1151804 A1 | 11/2001 |
| FR | 2617280 A | 12/1988 |
| WO | 03095952 A1 | 11/2003 |

OTHER PUBLICATIONS

European Search Report, for Application No. 060180791, dated Dec. 20, 2007.

* cited by examiner

*Primary Examiner*—Lien T Ngo
(74) *Attorney, Agent, or Firm*—Wood, Herron & Evans, L.L.P.

(57) ABSTRACT

A pneumatic fluid dispenser has an electromechanical actuator that is supported by a dispenser body and operable to move a mechanical stop in the dispenser body. A drive piston also mounted in the dispenser body is powered by pressurized air and is movable into contact with the stop. Thus, the stop limits a displacement of the drive piston and hence controls a volume of fluid dispensed by the pneumatic fluid dispenser.

21 Claims, 2 Drawing Sheets

PNEUMATIC DISPENSING SYSTEM WITH LINEAR ACTUATION AND METHOD

FIELD OF THE INVENTION

The present invention generally relates to fluid dispensing systems and more particularly, to a pneumatic dispensing system with a linear actuator.

BACKGROUND OF THE INVENTION

A wide variety of pneumatic fluid dispensers that dispense adhesives, sealants, lubricants and other fluids and liquids in a wide range of viscosities are well known. Pneumatic fluid dispensers have historically been favored because, in a manual dispenser, they are light and easy to manipulate, as well as being relatively inexpensive to manufacture and operate. Further, pneumatic technology has continued to improve, so that pneumatic fluid dispensers continue to be widely used. However, applications for faster and more precise fluid dispensing both manually, and on a production line, continue to grow rapidly; and the requirements and specifications for fluid dispensing applications are ever more rigorous. Many applications require that fluids be dispensed in very precise volumes and at very precise locations. Further, many fluids experience viscosity changes during a dispensing process. Such stringent application demands are pushing the capabilities of pneumatic fluid dispensers.

Pneumatic fluid dispensers commonly apply a pressurized fluid, for example, compressed air or shop air commonly found in a manufacturing area. Upon a manually initiated, or automatically generated, command signal, the compressed air is applied to, and pushes against, a piston in a barrel reservoir or syringe holding a fluid. The compressed air is applied at a fixed pressure over a controllable and variable time duration. Thus, the volume of fluid dispensed is proportional to the time that the compressed air is applied to the piston. In many applications, the fluid being dispensed has a relatively constant viscosity, and the volume being dispensed with each dispensing operation is fixed. In those applications, a pneumatic dispenser can be operated to accurately and reliably dispense the desired volumes of fluid.

However, in other applications, the viscosity of the fluid may change from one fluid dispensing cycle to another. In such applications, applying the compressed air for fixed time periods over successive dispensing cycles will result in different quantities of fluid being dispensed as the viscosity changes. Further, the compressibility of air makes it difficult for a pneumatic fluid dispensing system to consistently and precisely dispense a predicable fluid volume as the barrel reservoir moves from full to empty. Further, it is increasingly difficult for pneumatic fluid dispensing systems to meet dispensing volumetric accuracy and repeatability specifications of newer fluid dispensing fluids and applications.

It is also known to use an electromechanical drive system to move a piston in a barrel reservoir of a dispensing system. Such an electromechanical system imparts a positive displacement to the piston in the barrel reservoir and thus, provides a fluid dispenser having a volumetric accuracy and repeatability often superior to that of a pneumatic fluid dispensing system. With many hand held dispensers, a flexible cable transfers a mechanical force from an electric motor located on a bench-top to a screw or other mechanical drive in the hand held dispenser. With known electromechanical piston-drive systems, the electric motor must be sufficiently large to apply forces necessary to accurately move the piston over a wide range of fluid viscosities. Thus, such electromechanical drive systems are often larger and more complex and expensive than known pneumatic fluid dispensers.

Therefore, there is a need for an improved pneumatic fluid dispensing system and method that does not have the disadvantages discussed above.

SUMMARY OF THE INVENTION

The present invention provides a pneumatic fluid dispensing system that has a volumetric accuracy and repeatability comparable to dispensing systems using an electromechanical drive system. Further, the pneumatic fluid dispensing system of the present invention is simpler, lighter, less expensive and provides a faster total fluid dispensing cycle. The pneumatic fluid dispensing system of the present invention is capable of moving a piston in a barrel reservoir through a controllable positive displacement and thus, is especially useful when using fluids that experience changes in viscosity while they are being dispensed, for example, two part epoxies.

More specifically, in a first embodiment, the invention provides a pneumatic fluid dispenser connectable to a source of pressurized air and operable to dispense a volume of fluid. The pneumatic fluid dispenser has a dispenser body connectable to the source of pressurized air, and an actuator supported by the dispenser body. A stop in the dispenser body is movable by the actuator, and a drive piston mounted in the dispenser body is movable into contact with the stop by the pressurized air. The stop limits a displacement of the drive piston to control the volume of fluid dispensable by the pneumatic fluid dispenser.

These and other objects and advantages of the present invention will become more readily apparent during the following detailed description taken in conjunction with the drawings herein.

DETAILED DESCRIPTION OF THE INVENTION

Figure 1:
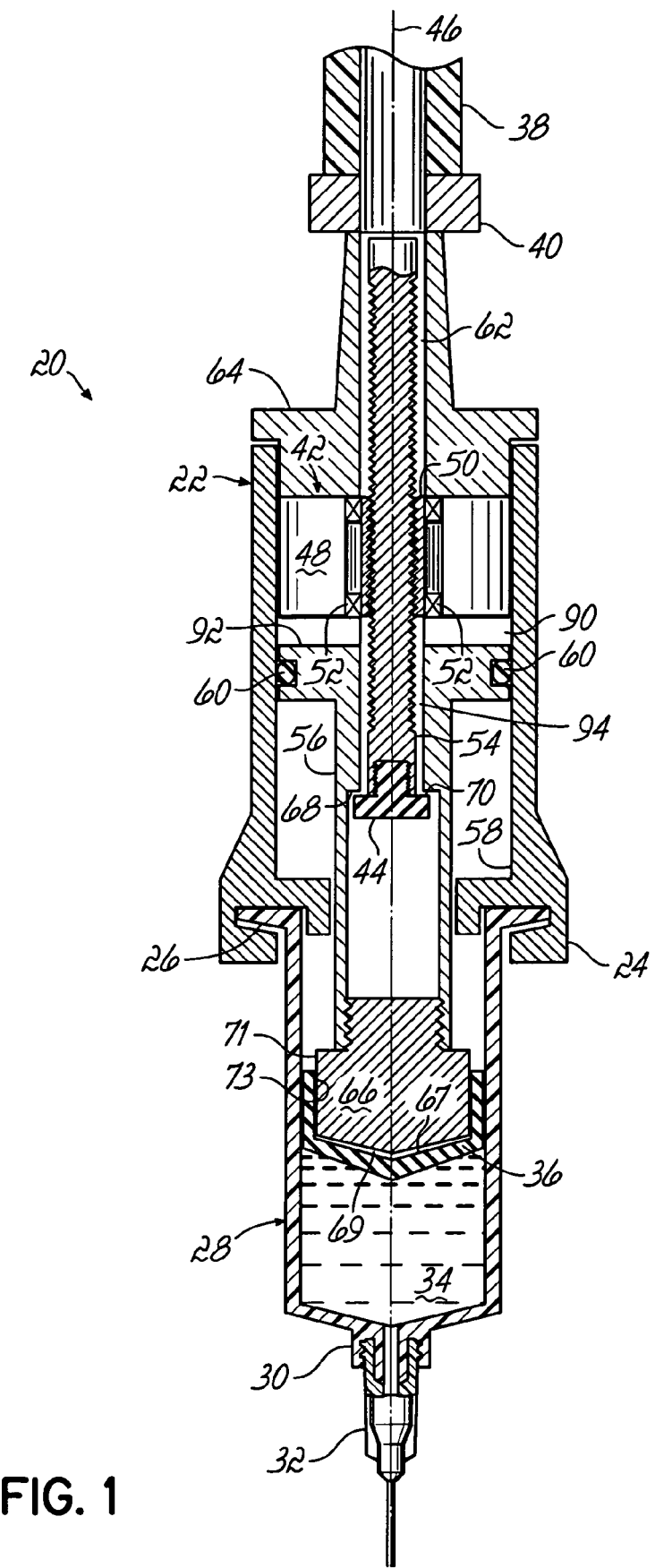
FIG. 1 is a cross-sectional view of a pneumatic fluid dispenser in accordance with the principles of the present invention.

Referring to FIG. 1, a pneumatic fluid dispenser 20 has a body 22 with a distal or lower end connector 24 to which a flange 26 of a fluid-filled barrel or syringe reservoir 28 is removably connected in a known manner. The barrel reservoir 28 has a luer lock fitting 30 to which a dispensing tip 32 is removably connected. A fluid 34 in the barrel reservoir 28 is dispensed through the dispensing tip 32 by a linear displacement of a barrel piston 36. The barrel piston 36 is moved by an application of a pressurized fluid, for example, compressed air, which is supplied via a hose 38 that is removably coupled to an upper end of the body 22 by a fitting 40.

The dispenser body 22 further supports a linear actuator 42 operative to precisely locate a stop 44 at different positions with respect to a longitudinal centerline 46. In the exemplary embodiment of FIG. 1, the linear actuator 42 is implemented by a motor 48, for example, a servo or stepping motor, that rotates an output shaft 50 supported by bearings 52. The motor 48 also has a brake feature that automatically brakes the output shaft when the motor is in a stopped state, thereby preventing inadvertent rotation of the output shaft 50. An actuator shaft 54 is threaded inside the output shaft 50. Thus, the output shaft 50 functions as a threaded nut; and the actuator shaft 54 is linearly displaced by rotation of the output shaft 50. The direction of the actuator shaft displacement is determined by the direction of rotation of the motor 48.

A drive piston 56 is sealingly engaged with inner walls of a cylinder 58 inside the dispenser body 22 via a seal 60, for example, an O-ring, that blocks the pressurized air from the hose 38 from moving past the drive piston 56. The pressurized air passes through an annular space 62 that extends between an outer surface of the actuator shaft 54 and inner surfaces of an end cap 64 and the output shaft 50. The end cap 64 is attached to a proximal or upper end of the dispenser body 22 by threads, bonding, welding, or other means. The actuator shaft 54 extends axially through the drive piston 56; and the stop 44 is connected to a lower end of the actuator shaft 54 below the drive piston 56 via threads, bonding, welding, or other known means.

A plunger 66 is connected to a lower end of the drive piston 56 by threads, bonding, welding, or other means. The plunger 66 is disposed adjacent to, and is contactable with, an upper surface 67 of the barrel piston 36; however, the plunger 66 is not in any way fastened, bonded, or otherwise rigidly connected to or lockable with, either permanently or temporarily, the barrel piston 36. In the example of FIG. 1, the plunger 66 is located in a cup-like cavity 69 formed on an upper side of the barrel piston. While there may be some contact between an external side surface 71 of the plunger 66 and an internal side surface 73 of the barrel piston cavity 69, such contact is minimal. Thus, if the plunger 66 is moved in a first direction toward the dispensing tip 32, the plunger 66 is able to precisely advance the barrel piston 36 toward the dispensing tip. However, if the plunger 66 is moved in the opposite direction away from the dispensing tip 32, the extent of motion of the barrel piston 36 is unpredictable. Further, any contact of the plunger 66 with the barrel piston 36 cannot interfere with a disengagement of the barrel reservoir 28 from the dispenser connector 24 and thus, a separation of the barrel piston 36 from the plunger 66.

The drive piston 56 has a shoulder surface 68 that is locatable adjacent to, and contactable with, a stop surface 70 of the stop 44. The stop surface 70 limits displacement of the drive piston 56 and thus, limits displacement of the barrel piston 36 and a consequential dispensing of the fluid 34.

Figure 2:
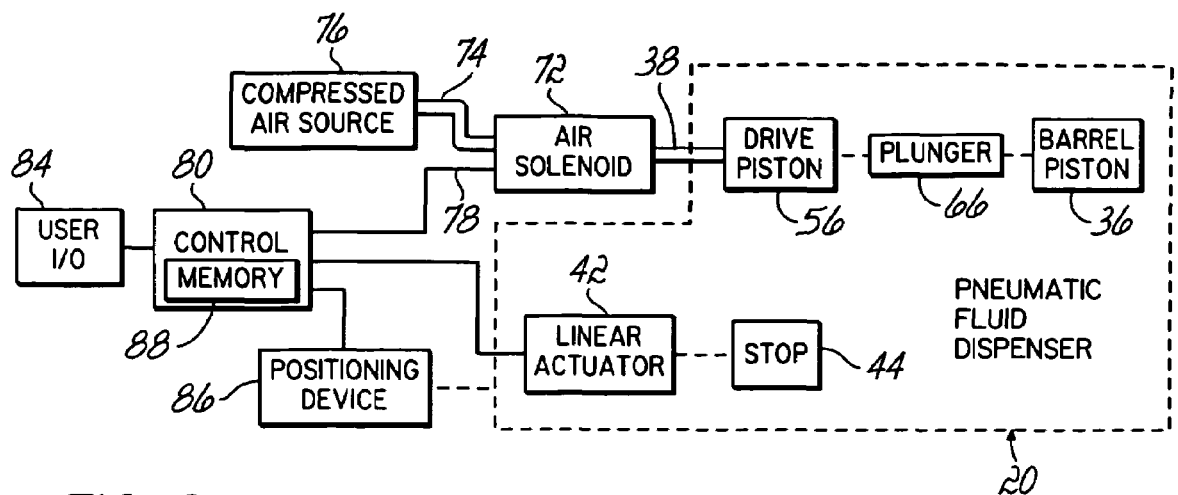
FIG. 2 is a flow chart of a fluid dispensing process in accordance with the principles of the present invention.

Referring to FIGS. 1 and 2, an air solenoid 72 has a first input 74 fluidly connected to a compressed air source 76 and a second input 78 electrically connected to a control 80. In response to command signals from the control 80, the air solenoid 72 applies and removes compressed air to an output that, by the air hose 38, is fluidly connected to the fluid dispenser 20 and an air chamber 90 above the drive piston 56. The control 80 has a user input/output interface 84 that is operable to permit a user to provide programs, data and commands to the control 80 for controlling an operation of a fluid dispensing cycle.

Figure 3:
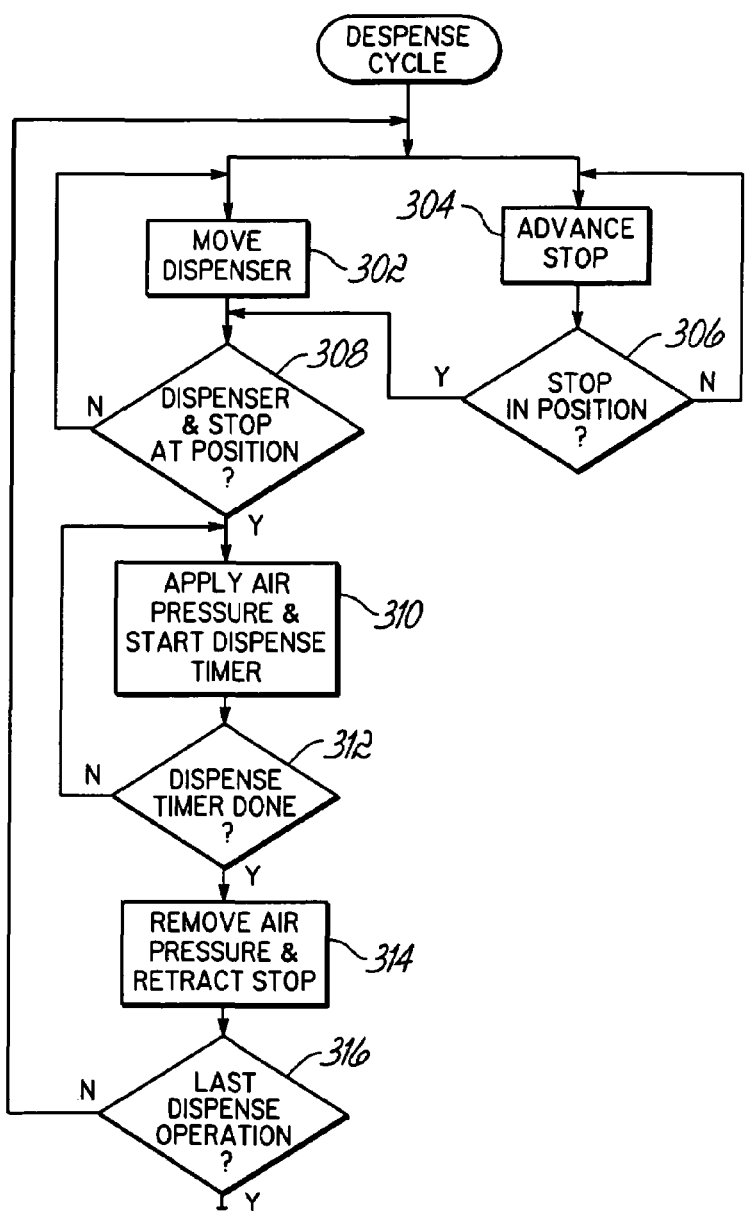
FIG. 3 is a schematic block diagram of the pneumatic fluid dispenser of FIG. 1.

In operation, the control 80 provides output command signals to a positioning device 86, for example, a multi-axis positioning system such as a robot, on which the pneumatic fluid dispenser 20 is mounted. Upon being moved to successive positions, the control 80 operates the air solenoid 72 and linear actuator 42 to execute a series of fluid dispensing operations. A typical dispensing cycle is illustrated in FIG. 3. A dispensing cycle may be initiated by the control 80 in response to either a command input from the user input/output interface 84 or a signal generated within the control 80 or from another device in the environment in which the fluid dispenser 20 is being used.

Upon initiating a dispense cycle, the control 80 provides, at 302, output command signals to the positioning device 86 commanding it to move the fluid dispenser 20 to a desired position with respect to a substrate onto which the fluid is to be dispensed. The control 80 is also operative, at 304, to provide command signals to the linear actuator 42 causing it to move the stop 44 through an axial displacement to a new position closer to the dispensing tip 32. The distance the stop 44 is advanced is directly dependent upon the volume of fluid 34 to be dispensed from the dispensing tip 32. The volume of dispensed fluid from the tip 32 is directly related to an incremental displacement of the barrel piston 36, which is controlled by motion of the plunger 66 and drive piston 56. Thus, by precisely controlling displacement of the pneumatically powered drive piston 56, the fluid dispenser 20 is able to precisely control the volume of fluid dispensed from the tip 32. The desired volume of fluid to be dispensed can be related to a displacement of the barrel piston 38 and hence, the drive piston 56, by a mathematical formula or algorithm storable in a memory 88 of the control 80. Alternatively, a table relating volumes of fluid to be dispensed to linear displacements of the drive piston 56 may be stored in the memory 88. In either event, the control 80 is able to operate the linear actuator 42 such that the stop 44 is axially positioned to limit a displacement of the drive piston 56, the plunger 66 and hence, the barrel piston 36 so that only a desired and precise volume of fluid is dispensed.

The control then, at 306, determines when the stop 44 has been moved to its new desired position and further determines, at 308, when the pneumatic fluid dispenser 20 has also been moved to its desired position. The control 80 is then operative, at 310, to command the air solenoid 72 to open, thereby directing compressed air through the hose 38, the annular space 62, into the chamber 90 and against an upper surface 92 of the drive piston 56. The pressure of the compressed air can be a maximum available pressure, thereby applying a maximum available force to the drive piston 56. The compressed air is operative to move the plunger 66 into contact with, and apply a dispensing force against, the barrel piston 36. The barrel piston 36 is moved downward through the barrel 28, thereby dispensing a desired volume of the fluid 34 from the dispensing tip 32. The compressed air moves the drive piston 56 until the piston shoulder 68 contacts the stop surface 70. Thus, a precise volume of the fluid 34 is dispensed from the tip 32 independent of the pressure of the compressed air and the duration that the compressed air is applied to the drive piston 56.

Upon initiating operation of the air solenoid 72 at 310, the control 80 simultaneously starts an internal dispense timer, which is set to a duration longer than the time required to move the drive piston 56 into contact with the stop 44 at a maximum expected viscosity of the fluid 34. Thus, regardless of the viscosity of the fluid 34, the drive piston 56 is moved against the stop 44 before the dispense timer expires. The control 80, at 312, detects an expiration of the dispense timer and thereafter, at 314, provides a signal commanding the air solenoid 72 to close, thereby disconnecting the compressed air source 76 from the hose 38 and the chamber 90 above the drive piston 56. The solenoid 72 is a three-way or exhausting solenoid valve; and therefore, in the closed state, it bleeds or vents the air hose 38 and air chamber to atmospheric pressure.

In addition, at 314, the control 80 provides command signals to the linear actuator 42 to retract the stop 44, that is, to move the stop 44 upward in a direction away from the dispensing tip 32. The magnitude of this incremental displacement is very small but sufficient to cause the drive piston 56 to retract slightly, that is, to move upward away from the dispensing tip 32. This slight retraction of the drive piston 56 and plunger 66 removes dispensing forces from the barrel piston 36 and thus, permits forces on the barrel piston 36 to equalize by slightly moving the barrel piston 36, if necessary. With a hydraulic pressure of the fluid 34 in the barrel 28 being quickly relieved and equalized, the dispensing of the fluid 34 through the dispensing tip 32 is quickly terminated; and a potential for further inadvertent dispensing of the fluid 34 is eliminated.

The control 80 then determines, at 316, whether the most recent dispensing operation was the last one in the dispensing cycle. If not, the control 80 iterates through process steps 302-314 to move the pneumatic fluid dispenser 20 to other dispense positions and initiate a fluid dispensing operation at each position. Upon the control 80 detecting the last dispensing operation, the dispensing cycle is terminated.

The pneumatic fluid dispenser 20 has several advantages. First, it is pneumatically operated but capable of providing successive dispensing operations that have a volumetric accuracy and repeatability comparable to fluid dispensing systems using an electromechanical drive system. Second, by using an electromechanical system that moves only a relatively small actuator shaft 54 and stop 44, a simple, light weight and less expensive linear actuator 42 can be used. Third, the stop 44 can be moved to its desired position simultaneously with the fluid dispenser 20 being moved to its next dispense position, and thus, using the movable stop 44 does not increase the time required for a fluid dispensing operation. Fourth, a maximum pressure available from the compressed air source 76 can be applied to the drive piston 56, and thus, the time required for each fluid dispensing operation as well as a total fluid dispensing cycle is minimized. Fifth, motion of the barrel piston 36 is determined by a position of the stop 44 and not the compressed air pressure or the time duration that the compressed air is applied to the fluid dispenser. Therefore, a desired volume of the fluid is dispensed regardless of its viscosity; and the pneumatic fluid dispenser 20 is especially useful when using fluids that experience changes in viscosity while they are being dispensed, for example, two part epoxies.

While the present invention has been illustrated by a description of various embodiments and while these embodiments have been described in considerable detail, there is no intention to restrict or in any way limit the scope of the appended claims to such detail. Additional advantages and modifications will readily appear to those skilled in the art. For example, in the exemplary embodiment of FIG. 2, the pneumatic fluid dispenser 20 is mounted on a positioning device 86; however, in other embodiments, the structure of a stop movable by an electromechanical drive to limit motion of a pneumatically powered piston can also be implemented in handheld and other pneumatic fluid dispensers.

Therefore, the invention in its broadest aspects is not limited to the specific details shown and described. Consequently, departures may be made from the details described herein without departing from the spirit and scope of the claims which follow.

What is claimed is:

1. A pneumatic fluid dispenser connectable to a source of pressurized air and operable to dispense a volume of fluid, the pneumatic fluid dispenser comprising:
a dispenser body adapted to be connected to the source of pressurized air;
an actuator supported by the dispenser body;
a stop movable by the actuator; and
a drive piston mounted in the dispenser body and adapted to be placed in fluid communication with the source of pressurized air, the drive piston being movable into contact with the stop by the pressurized air, and the stop limiting a displacement of the drive piston to control the volume of fluid dispensable by the pneumatic fluid dispenser;
said stop mounted within the drive piston and movable by the actuator.

2. The pneumatic fluid dispenser of claim 1 wherein the actuator comprises an electromechanical drive connected to the stop and operable to move the stop in a linear direction.

3. The pneumatic fluid dispenser of claim 2 wherein the electromechanical drive further comprises:
an electric motor;
an output shaft rotatable by the electric motor; and
an actuator shaft connected to the output shaft and movable linearly in response to rotation of the output shaft.

4. The pneumatic fluid dispenser of claim 3 wherein the actuator shaft is movable in a first linear direction in response to a first rotation of the motor and the actuator shaft is movable in an opposite linear direction in response to an opposite rotation of the motor.

5. The pneumatic fluid dispenser of claim 3 wherein the electric motor is a servo motor.

6. The pneumatic fluid dispenser of claim 3 wherein the electric motor is a stepper motor.

7. The pneumatic fluid dispenser of claim 3 wherein the actuator shaft extends through the drive piston.

8. The pneumatic fluid dispenser of claim 7 wherein the actuator shaft is connected to the electric motor at a location adjacent one side of the drive piston, and the stop is connected to the actuator shaft and is located adjacent an opposite side of the drive piston.

9. The pneumatic fluid dispenser of claim 1 wherein the drive piston comprises:
a first surface in fluid communication with the source of pressurized air; and
a second surface movable into contact with the stop.

10. The pneumatic fluid dispenser of claim 1 wherein the pneumatic fluid dispenser is connectable to a barrel reservoir housing a fluid beneath a barrel piston, the drive piston being adapted to push against and advance the barrel piston.

11. A pneumatic fluid dispenser connectable to a source of pressurized air and operable by the source of pressurized air to dispense a volume of fluid from a barrel reservoir containing the fluid beneath a barrel piston, the pneumatic fluid dispenser comprising:
a dispenser body comprising:
a fluid input adapted to be connectable to the source of pressurized air; and
a connector adapted to be connected to the barrel reservoir;
an actuator supported by the dispenser body;
a stop surface movable by the actuator within the dispenser body; and
a drive piston mounted in the dispenser body and adapted to be movable by the pressurized air toward the stop surface, the drive piston comprising:
a first surface in fluid communication with the fluid input,
a second surface movable into contact with the stop surface, and
a plunger positionable adjacent to, and in contact with, the barrel piston, the plunger pushing the barrel piston through a linear displacement limited by the second surface contacting the stop surface, thereby dispensing the volume of fluid from the barrel reservoir;

said stop surface mounted within the drive piston and movable by the actuator within the dispenser body.

12. A method of operating a pneumatic fluid dispenser to dispense a volume of fluid, the method comprising:

moving a stop with a controllable actuator through a displacement in a first direction corresponding to a volume of the fluid dispensable with the pneumatic fluid dispenser;

applying a pressurized fluid to a drive piston slidably mounted in a body of the pneumatic fluid dispenser, the pressurized fluid moving the drive piston toward the stop; and stopping motion of the drive piston with the stop while the stop is located within the drive piston.

13. The method of claim 12 further comprising terminating an application of the pressurized fluid to the drive piston.

14. The method of claim 12 further comprising moving the stop with the controllable actuator in an opposite direction.

15. The method of claim 12 wherein after stopping motion of the drive piston, the method further comprises:

terminating an application of the pressurized fluid to the drive piston, and moving the stop with the controllable actuator in an opposite direction.

16. The method of claim 12 further comprising:

applying the pressurized fluid to a first surface of the drive piston; and operating an electric motor to move the stop through a linear displacement adjacent a second surface of the drive piston opposite the first surface.

17. The method of claim 16 further comprising mounting the electric motor at a location adjacent the first surface of the drive piston.

18. A method of operating a pneumatic fluid dispenser to dispense volumes of fluid, the method comprising:

locating the pneumatic fluid dispenser at a first position relative to a target at which fluid is to be dispensed;

moving a mechanical stop with a controllable actuator through a displacement corresponding to a volume of the fluid dispensable with the pneumatic fluid dispenser;

applying a pressurized fluid to a drive piston slidably mounted in a body of the pneumatic fluid dispenser, the pressurized fluid moving the drive piston toward the stop while the dispenser is at the first position;

stopping motion of the drive piston with the stop; and iterating the steps of locating, moving, applying and stopping for at least a second position of the pneumatic fluid dispenser relative to the target different from the first position.

19. The method of claim 18 further comprising locating the pneumatic fluid dispenser relative to the target substantially simultaneously with moving the mechanical stop.

20. A method of operating a pneumatic fluid dispenser to dispense fluid from a barrel reservoir housing a fluid beneath a barrel piston, the method comprising:

moving a stop with a controllable actuator through a displacement corresponding to a displacement of the barrel piston dispensing a desired volume of the fluid from the barrel reservoir;

applying a pressurized fluid to a drive piston slidably mounted in a body of the pneumatic fluid dispenser and in mechanical communication with the barrel piston, the pressurized fluid moving the drive piston toward the stop while moving the barrel piston and dispensing the fluid from the barrel reservoir; and mechanically stopping motion of the drive piston with the stop to terminate motion of the barrel piston and dispensing of the fluid from the barrel reservoir.

21. The method of claim 18, wherein locating the pneumatic fluid dispenser includes controlling the dispenser with a robot.

* * * * *

UNITED STATES PATENT AND TRADEMARK OFFICE
CERTIFICATE OF CORRECTION

PATENT NO. : 7,617,953 B2
APPLICATION NO. : 11/238267
DATED : November 17, 2009
INVENTOR(S) : Robert P. Tourigny It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1084 days.

Signed and Sealed this

Twelfth Day of October, 2010

David J. Kappos
*Director of the United States Patent and Trademark Office*